Jan. 6, 1953  A. J. MUSSELMAN  2,624,387
AIR CHAMBER WHEEL
Filed April 24, 1950

INVENTOR.
ALVIN J. MUSSELMAN
BY
H. W. Brelsford
ATTORNEY

Patented Jan. 6, 1953

2,624,387

UNITED STATES PATENT OFFICE 2,624,387

AIR CHAMBER WHEEL

Alvin J. Musselman, Santa Barbara, Calif.; County National Bank and Trust Company of Santa Barbara, a national banking association, and Morris M. Musselman executors of said Alvin J. Musselman, deceased Application April 24, 1950, Serial No. 157,833

8 Claims. (Cl. 152—10)

1

My invention relates to vehicle wheels employing pneumatic tires and has particular reference to a wheel design that provides an air space or chamber in the region between the wheel hub and the tire bead.

It is well known that pneumatic tires are much superior in riding performance when the interior of the tires is freely communicated to a large air chamber or reservoir. When a tire thus communicated strikes a projection, there is no appreciable build up in pressure such as is encountered with conventional tires. Instead the air displaced by the projection merely travels to the air chamber with little build up in pressure. This makes possible a low pressure tire which is extremely soft riding and which is efficient from a propulsion standpoint because the tire and its vehicle are not lifted by the projection of the road, but instead the tire merely yields and folds around the projection and the vehicle is not lifted. Thus motive power for the vehicle is not lost in lifting the vehicle and a saving in power results.

While various types of air chambers or reservoirs may be employed, one very satisfactory procedure is to incorporate the air chamber within the confines of the wheel itself. Various wheel structures have heretofore been employed with this object in view, and in general they define an annular chamber formed between two plates or discs disposed on opposite ends of a wheel hub. Such wheels I refer to as air chamber type wheels. These wheels however, have been generally unsatisfactory because heavy thicknesses of metal have been employed to withstand the tremendous pneumatic forces tending to separate the discs or plates. The resultant wheels have been too heavy and expensive to be commercially satisfactory.

I have discovered a novel type of wheel construction which permits the outer discs to be made of light weight sheet metal. Furthermore, these outer discs are easy to form with a simple stamping or drawing operation, including the outer bead retaining flange. The result is an air chamber type wheel that is light in weight, simple to manufacture, and extremely inexpensive. Furthermore, it lends itself readily to a hand nut disassembly construction, particularly useful when innertubes are employed. Such a construction permits innertubes to be quickly removed from the wheel without stretching them over the wheel discs.

It is therefore a general object of my invention to provide an improved air chamber type of wheel for pneumatic tires;

2

Another object of my invention is to provide a wheel having an annular air chamber disposed between two wheel discs of novel design;

Still another object of my invention is to provide light weight sheet metal discs for air chamber wheels employing pneumatic tires;

Another object is to provide an air chamber wheel having novel sheet metal discs, one of which is removably held in place by a hand nut;

Other objects and advantages of my invention will be apparent in the following description and claims considered together with the accompanying drawings forming an integral part of this specification.

Fig. 2 is an exploded sectional view of the wheel components of Fig. 1;

Figure 1:
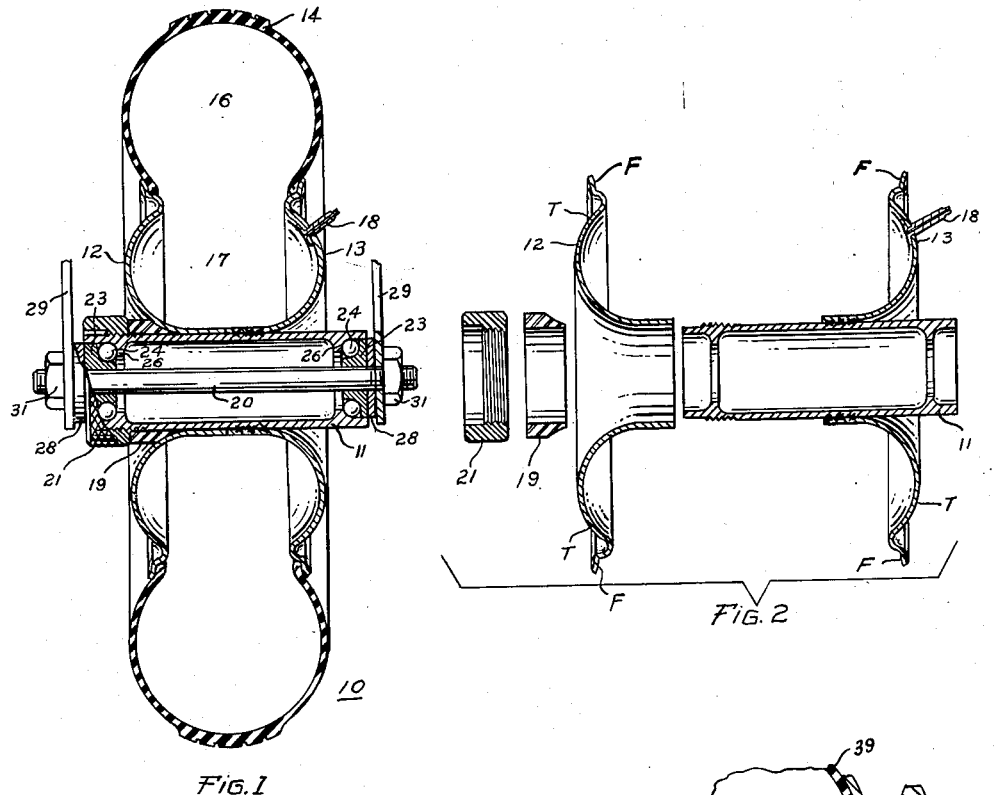
Fig. 1 is a view in full section of a wheel employing my invention with a pneumatic tire in place on the wheel.

Referring to Figs. 1 and 2 there is illustrated a wheel 10 having a hub 11, and oppositely disposed disc members 12 and 13 mounted thereon. A flexible tire or tire casing 14 may be mounted on the discs to enclose a tire air chamber 16 and a wheel air chamber 17, both freely communicating with each other. An air valve 18 may be connected to one of the discs for admitting and removing air from the chambers 16 and 17.

The disc members 12 and 13 may be permanently positioned on the hub 11 if self sealing tires are used that require no innertube. In this event the discs may be sealed to the hub and the air seal for the tire is made at the beads where they engage the tire flanges. I prefer at present, however, to make one of the discs removable and accordingly provide a split bearing ring 19 to bear against disc 12. The ring may be secured in place by a jam nut or hand nut 21. This nut is so designated because it may be tightened and removed by the fingers when air pressure is eliminated from within the wheel. Also the nut is jammed tight in place and cannot move when air pressure is applied to the inside of the wheel, and lock nuts and washers, etc. are unnecessary. The jam nut 21 may be knurled on the outside, if desired.

The bearing ring 19 is illustrated in detail in

Figure 3:
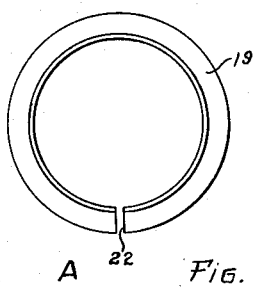
Figs. 3A and 3B are plan views of a compression ring employed with a jam nut on the wheel construction of Fig. 1 showing the contracted and the free conditions of the ring respectively.

Figs. 3A and 3B. The ring is designed to fit freely over the hub 11 at which time the split 22 in the ring is in its free condition. When air pressure is applied to the wheel the disc 12 presses on the ring compressing it radially, causing it to tightly grip the hub 11. The split 22 thereupon is reduced in size as illustrated in Fig. 3A. The ring 22 may not be strictly necessary in addition to the jam nut 21, but I prefer to use it since it simplifies the nut construction and prevents galling of the discs during disc removal and replacement.

Any suitable type axle may be employed for my wheel 10 and that illustrated in Fig. 1 may be used on light weight vehicles; such as light airplanes, motorcycles, bicycles, etc. For heavier vehicles such as heavy airplanes and automobiles, stronger cantilever spindles or axles may be used. As illustrated, an axle bolt 20 may have races 23 threaded on opposite ends which may guide ball bearings 24 in a race 26 formed on an interior annular projection at each end of the hub. Lock washers 28 may be threaded against each race member and outwardly of these may be disposed supports 29 connected to the vehicle. Nuts 31 may secure the supports on the axle bolt.

The discs 12 and 13 are formed particularly in accordance with my invention. They may be formed of sheet metal; such as steel, stainless steel, high strength aluminum, etc., by simple punching or drawing operations. These discs or wall members of the wheel may have the form of a flared funnel or horn and are oppositely disposed on the hub. In the form illustrated they are each secured to the hub near the center of the hub. The permanently positioned disc 13 may be welded, brazed or soldered to the hub whereas the removable disc is held in place by the jam nut.

The flared funnel or horn construction is inherently strong in that the pneumatic forces present within the air chamber 17 act perpendicularly on that surface tending to crush the funnel and expand the discs outwardly or away from each other. The funnel construction is eminently suited to resist such forces inasmuch as the major bulk of the forces are resisted by compression of the funnel shape rather than by bending forces as is common with flat metal discs. It is well known that even very thin sheet metal shells will resist evenly applied compressive forces and is akin to trying to crush a sheet metal cone by the application thereto of hydraulic or pneumatic forces. The principle of the arch accordingly is not only employed but is much more successfully employed inasmuch as there is a series of completely circular elements which are subject to uniform radial forces and thus the structure is inherently strong.

Not only are the two discs 12 and 13 of a flared horn or funnel construction, but in addition they are provided with a reverse bend at their outer tips in the region designated by the letter T. At the outer extremity of each disc there may be provided a flange portion F upon which may be fitted the corresponding beads of the pneumatic tire 14, as clearly illustrated in Fig. 1. The reverse bend at region T gives rise to a tore or torus shape, otherwise known as the familiar doughnut shape. The two discs 12 and 13 accordingly define a generally toroidal surface of which the outer periphery is removed. Hence each disc surface may be defined as a hemi-toroidal surface, assuming that the cutting of the tore takes place along a line perpendicular of the axis of generation of the tore. However, when the two hemi-toroidal surfaces are placed together the tore is not complete as the outer periphery is open.

The effect of the reverse bend at T is to extend radially outwardly of the hub the flared horn or funnel shape with a minimum of localized bending forces. This may be readily appreciated when the discs 13 and 12 are compared to the usual flat discs employed on some air chamber wheels. With flat discs the maximum bending tending to force the discs apart takes place at the hub. The use of the flared funnel shape, however, transfers the point of maximum bending from the hub to the outermost or axially perpendicular edge of the flared funnel shape. The bending due to the expanding action on the discs 12 and 13 therefore acts on an annular area at the juncture of the section T with the flared funnel shape. Thus the bending is distributed over a large area instead of the narrow hub area as occurs with flat wheel discs. The reverse bend at T also increases the strength against bending due to the fact that the metal of section T must compress as the bead flange F is bent uniformly outwardly. In actual practice, there is little elastic expansion or outward movement of the discs 12 and 13.

Figure 4:
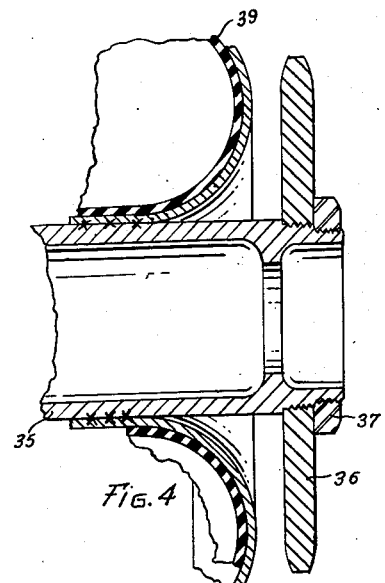
Fig. 4 is a view in full section of a modified form of my invention illustrating the use of an innertube as well as the provision of a driving sprocket mounted on the wheel hub.

Referring to Fig. 4, there is illustrated a modified form of my wheel invention wherein a hub 35 may have a drive sprocket 36 threaded on the end opposite the hand nut. The sprocket may be locked thereon by a reversely threaded nut 37. This sprocket construction may be employed on the driving wheels of bicycles, motorcycles, etc. and illustrates the adaptability of my wheel construction. Also it will be appreciated by those skilled in the art that my hub and wheel may receive conventional free wheeling sprockets, conventional coaster brakes and other mechanisms.

Also illustrated in Fig. 4 is a wheel disc 38 provided in accordance with my invention, against which may be an innertube 41. The use of an innertube is preferably on my wheel constructions wherein one disc is removable as illustrated in Figs. 1 and 2. The innertube may be applied to, and removed from, the wheel by removal of one disc, as disc 12 in Fig. 2. The innertube accordingly may be placed over the hub, and disc 12 replaced.

In using wheels embodying my invention, either a self sealing wheel may be used, or an innertube may be used. The wheel assembly of Fig. 1 is without an innertube and air accordingly is admitted through the valve 18 secured directly to disc 13. The tire 14 may be mounted on the assembled wheel of Fig. 1 by using the familiar drop center principle, or the removable disc 12 may be taken off and the tire seated on flange F of each wheel separately. Sealer material is preferably used on each tire bead and if desired may be used on the juncture line of the two discs.

The hand nut 21 may be freely removed when the pressure inside the wheel is reduced. When the nut is completely unthreaded, the split ring 19 may be removed from the hub and thereafter disc 12 is freely lifted off. When the innertube or tire is replaced or other operation effected, the disc, ring and nut are replaced and the nut threaded freely by hand to its desired location. When air under pressure is applied to the interior of the wheel, the pneumatic forces cause the split ring to close and grasp the hub and the same forces jam the handnut 21 against unthreading.

Various materials of construction may be employed. The hub 11 may be a screw machine part formed from tube stock. The ring 19 and nut 21 may also be screw machine stock; for example steel, aluminum or other metal. The discs 12 and 13 are preferably formed of high strength sheet material; such as steel, stainless steel or high strength aluminum alloy. All parts may be plated if desired.

I am aware that disc type air chamber wheels are old and that funnel type wheels have been employed, especially for airplanes. My novel construction, however, is an advance in providing a light weight and inexpensive wheel made possible by sheet metal funnels or cones with apexes adjacent and secured to a hub near the central part of the hub. The diameter of the disc is several times that of the hub, which may be generally cylindrical if desired, and the outer ends of the funnels are unsupported by other members.

Various modifications may be made without departing from the teaching of my invention. For example, the reverse or toroidal bend in the region T of the disc could be eliminated and a flat annular extremity used, or the tire bead flange could be formed at the outermost flare of the funnel portion. These and other modifications could be made and for these reasons I include within my invention all such variants as fall within the true spirit, scope and teaching hereof.

I claim:

1. An air chamber wheel for pneumatic tires comprising a hub, and a pair of sheet metal flared funnels oppositely disposed on the hub and secured thereto with apical portions adjacent and each flared portion terminating in an outer rim, whereby a tire may be disposed on the two rims to enclose the region between the two funnels to form an air chamber.

2. A wheel as defined in claim 1 characterized by the provision of means to supply air under pressure to the chamber.

3. A wheel as defined in claim 1 characterized by the funnels being completely self supporting without additional support members being employed.

4. An air chamber wheel for pneumatic tires comprising a hub, and a pair of sheet metal hemi-toroidal surfaces oppositely disposed on the hub and each terminating in an outer rim, whereby the two outer rims are spaced from each other and a tire may be mounted on the two rims to enclose the area between the hemi-toroids to define an air chamber.

5. An air chamber wheel for pneumatic tires comprising a hub, and a pair of flared funnels oppositely disposed on the hub and secured thereto with apical portions adjacent and each flared portion terminating in an outer rim, characterized by the rim diameter being several times larger than the hub diameter, whereby a tire may be mounted on the two outer rims.

6. An air chamber wheel for pneumatic tires comprising a generally cylindrical hub, a pair of sheet metal flared funnels with apical portions terminating in cylinders having an inside diameter similar to the outside diameter of the hub, and means for retaining the funnels on the hub in opposite array with apical portions adjoining.

7. An air chamber wheel for pneumatic tires comprising a generally cylindrical hub threaded on one end, a pair of sheet metal flared funnels with apical portions terminating in cylinders having inside diameters similar to the outside diameter of the hub and one of the funnels being permanently secured to the hub and flaring away from the threaded end, and a hand nut threaded on the hub for retaining the other funnel in place on the hub.

8. A wheel as defined in claim 7 wherein a split ring is employed between the nut and the other funnel.

ALVIN J. MUSSELMAN.

REFERENCES CITED

The following references are of record in the file of this patent:

UNITED STATES PATENTS

| Number | Name | Date |
|---|---|---|
| 1,591,413 | Blaschke | July 6, 1926 |
| 1,710,265 | Llewellyn | Apr. 23, 1929 |
| 1,923,975 | Harlan | Aug. 22, 1933 |
| 2,517,521 | Zere | Aug. 1, 1950 |